United States Patent [19]

Smith

[11] Patent Number: 5,774,241
[45] Date of Patent: Jun. 30, 1998

[54] CONVERGING BEAM HOLOGRAPHIC DECKLIT CHMSL

[75] Inventor: Ronald T. Smith, Corona Del Mar, Calif.

[73] Assignee: Hughes Aircraft Company, El Segundo, Calif.

[21] Appl. No.: 592,949

[22] Filed: Jan. 29, 1996

[51] Int. Cl.$^6$ .............................. G02B 5/32; G03H 1/00; B60Q 1/26; B60Q 1/44
[52] U.S. Cl. ............................. 359/15; 359/13; 359/14; 362/80.1; 340/479
[58] Field of Search .................. 359/13, 14, 15, 359/19; 362/80.1; 340/479

[56] References Cited

U.S. PATENT DOCUMENTS

| | | | |
|---|---|---|---|
| 4,966,426 | 10/1990 | Moss et al. | 359/15 |
| 5,383,039 | 1/1995 | Smith | 359/15 |
| 5,455,692 | 10/1995 | Wreede | 359/14 |
| 5,488,493 | 1/1996 | Moss | 359/13 |

*Primary Examiner*—Paul M. Dzierzynski
*Assistant Examiner*—Audrey Chang
*Attorney, Agent, or Firm*—Leonard A. Alkov; William C. Schubert; Glenn H. Lenzen, Jr.

[57] ABSTRACT

A holographic stoplight system that includes a stoplight hologram (21, 21') supported adjacent the inside surface of a rear window (211) of a vehicle, and a light source (29, 31) for providing a converging beam that is vertically converging and predominantly horizontally colimated. The stoplight hologram is illuminated with the vertically converging beam, or with a predominantly collimated beam provided by a collimating lens (27) that collimates the vertically converging beam.

4 Claims, 1 Drawing Sheet

CONVERGING BEAM HOLOGRAPHIC DECKLIT CHMSL

BACKGROUND OF THE INVENTION

The disclosed invention is directed generally to holographic center high mounted stoplight systems for vehicles, and more particularly to a holographic center high mounted stoplight system that incorporates a converging illumination beam.

Present federal regulations require center high mounted stoplights (CHMSLs) in addition to the standard stoplights mounted in the rear portion of an automobile. The CHMSLs are intended to maximize the visibility of the automobile braking indicators to drivers following the braking vehicle, and are commonly mounted on the rear window of an automobile.

CHMSLs have commonly been implemented as a standard lenticular lens and an illuminating incandescent bulb and reflector enclosed in a housing that is typically secured adjacent the top or bottom of an automobile rear window. However, the bulky housing partially obscures the rearward vision of the driver, and moreover imposes limitations on the design of the automobile.

CHMSLs have been also integrated into automobile body parts such as rear decks, spoilers, roofs, which to some degree substantially reduce or remove the rearward vision problem. However, such stoplights are complex and may impose limitations on the design of the automobile.

Holographic CHMSL systems have also been developed in order to efficiently meet the stoplight regulations. A holographic CHMSL system typically includes a stoplight hologram secured on or adjacent the inside surface of the rear window of a vehicle, a playback light source activated by the braking system of the vehicle for illuminating the stoplight hologram with reconstruction illumination, and possibly a red filter located in the light path between the playback light source and the hologram. In order to minimize the power of the playback light source while producing diffracted stoplight illumination of the required luminous intensity, the playback light source is preferably placed as close as practicable to the hologram, but out of driver's rearward field of view. For example, the playback light source can be located beneath a generally horizontal rear deck that is adjacent the lower portion of the rear window of a vehicle. Typically, the light source is configured to provide a collimated beam, and the hologram is designed to play back most efficiently with the collimated beam.

Considerations with a collimated beam holographic CHMSL system include the complications of reducing the size of the CHMSL hologram. In particular, it would be beneficial to make the hologram no larger than necessary to meet the federal emitting area requirements, so as to reduce the amount of obstruction to rearward visibility and to reduce the material cost of making the CHMSL hologram. Reducing the size of a collimated beam CHMSL hologram requires reducing the horizontal and vertical extent of the reconstruction beam to substantially confine the reconstruction illumination to the reduced size hologram. Beam reduction would be best accomplished by reducing the size of the collimating reflector of the playback light source while maintaining a suitable bulb to reflector distance. However, reducing reflector size may unacceptably reduce the percentage of light collected off the light source bulb.

SUMMARY OF THE INVENTION

It would therefore be an advantage to provide a holographic stoplight system having a reduced size stoplight hologram.

The foregoing and other advantages are provided by the invention in a holographic stoplight system that includes a stoplight hologram supported adjacent the inside surface of a rear window of a vehicle, and a light source for providing a converging beam that is vertically converging and predominantly horizontally collimated. The stoplight hologram is illuminated with the vertically converging beam, or with a predominantly collimated beam provided by a collimating lens that is interposed between the light source and the stoplight hologram.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
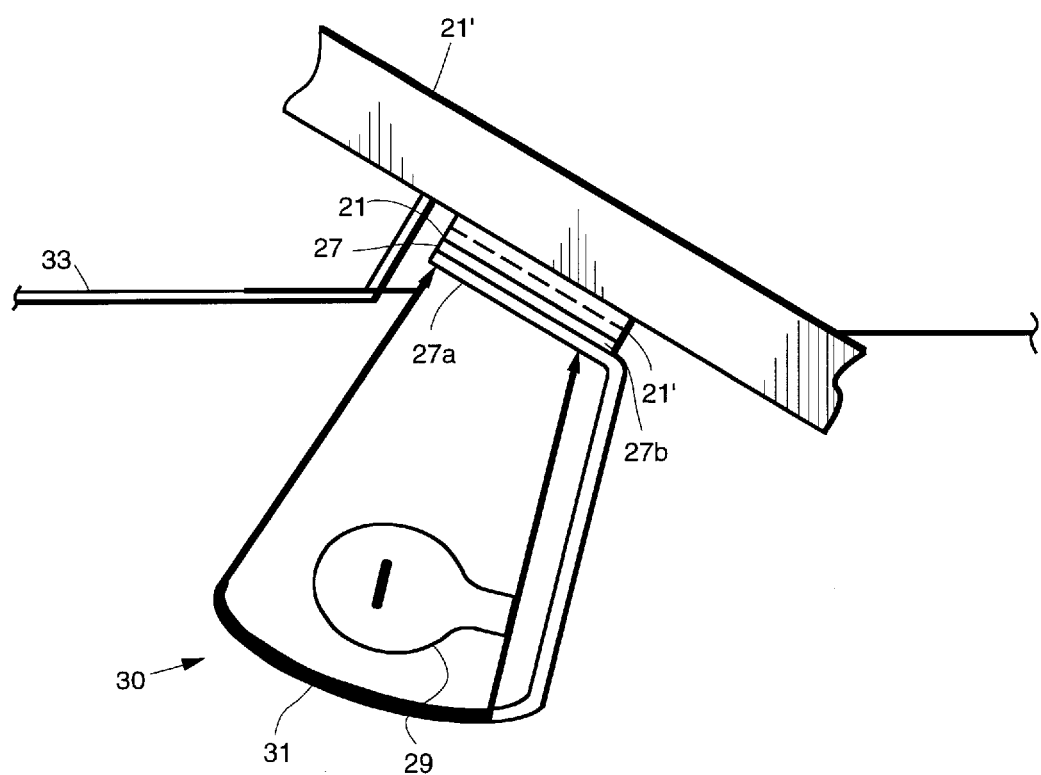
FIG. 1 is a schematic side elevational view of a holographic center high mounted stoplight system in accordance with the invention.

In the following detailed description and in the several figures of the drawing, like elements are identified with like reference numerals.

Referring now to FIG. 1, shown therein is a center high mounted stoplight system which includes a transmission CHMSL hologram 21 that is suitably supported adjacent the inside surface of an automobile rear window 211. The CHMSL hologram 21 diffracts reconstruction illumination for which it is configured to produce stoplight illumination that is visible from behind the automobile over the appropriate vertical and horizontal viewing angles.

The reconstruction illumination for the CHMSL hologram 21 is provided by a vertically converging and horizontally collimated beam that is produced by a light source 30 and filtered by a high pass filter 27 having a cutoff wave-length of about 600 nanometers (nm). As a result of the spectral characteristics of human vision, the image provided by the CHMSL hologram 21 will be perceived as red, with the apparent peak luminous intensity being somewhere between about 600 and 620 nm. In other words, the high pass filter 27 comprises a red filter. The illumination source 30 is mounted forward of the CHMSL hologram 21 and out of the rearward viewing angle of the driver beneath a generally horizontal rear deck 33 that is adjacent the lower portion of the rear window 211 of the automobile. By way of illustrative example, the illumination source 30 and the high pass filter 27 are formed as an integral assembly.

The high pass filter 27 more particularly comprises a substrate having an input surface 27a and an output surface 27b, and the CHMSL hologram 21 can be laminarly disposed on the output surface 27b of the high pass filter. Alternatively, a CHMSL hologram 21' can be laminarly attached to the rear window 211 as shown by broken lines. In such alternative embodiment, the high pass filter 27 can be conveniently located away from the rear window 211.

The light source 30 more particularly includes an incandescent bulb 29 and a para-elliptical reflector 31 that cooperates with the filament of the incandescent bulb 29 to produce a beam that converges in along a vertical axis and is predominantly collimated along a horizontal axis such that the beam would otherwise approximately converge to a line focus beyond the exit side of the CHMSL hologram 21 in the absence of the high pass filter 27 and the CHMSL hologram 21. In particular, the vertical extent of the reconstruction beam decreases with distance from the light source 30 and the horizontal extent of reconstruction beam remains substantially constant with distance from the light source 30, and the amount of vertical convergence is selected to locate the line focus beyond the exit side of the CHMSL hologram 21. The incandescent lamp 29 is connected to the brake light actuating circuit of the automobile so as to be energized when the brake pedal is depressed.

In accordance with one aspect of the invention, the high pass filter 27 is formed as a planar substrate wherein the incident surface 27a and the exit surface 27b are parallel planar surfaces, such that the CHMSL hologram 21 is illuminated with a beam that is vertically converging and predominantly horizontally collimated at the hologram.

By way of illustrative example, the CHMSL hologram 21 comprises an array of holographic lenslets as disclosed in U.S. Pat. No. 5,387,989, incorporated herein by reference, and as configured for the converging playback beam illumination described herein.

In accordance with a further aspect of the invention, the high pass or red filter 27 comprises a collimating planoconcave cylindrical Fresnel lens for collimating the vertically converging beam provided by the light source 30, such that the CHMSL hologram 21 is illuminated with a predominantly collimated beam. In this implementation, the input surface 27a of the red filter 27 comprises a series of small horizontally extending refracting facets, and the output surface 27b of the red filter comprises a planar surface which can be utilized to support the CHMSL hologram 21.

The holographic stoplight system having a red planoconcave cylindrical Fresnel lens functions similarly to the holographic stoplight system having a planar red filter, except that the positioning of CHMSL hologram relative to the light source 30 does not need to be as precise since the reconstruction beam at the CHMSL hologram 21 comprises a collimated beam. In particular, since the illumination provided by the Fresnel lens is predominantly collimated, the placement of the CHMSL hologram relative to the Fresnel lens does not have to be as precise the placement of the CHMSL hologram relative to the light source in the system that does not include the Fresnel lens. Thus, slight misalignment of the CHMSL hologram on the planar face of the Fresnel lens or on the inside surface of the rear window will not have any substantial detrimental effect, so long as the Fresnel lens is precisely aligned, which can be readily accomplished. In other words, with the Fresnel lens the alignment burden is transferred from the hologram attachment task to the Fresnel lens attachment task.

The foregoing has thus been a disclosure of a holographic CHMSL system having a reduced size stoplight hologram that advantageously provides for reduced rearward visibility obstruction, improved packaging, and reduced hologram cost.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic stoplight system for a vehicle having a rear window having an inside surface and an outside surface, comprising, a light source for providing a converging beam that is vertically converging and predominately horizontally collimated via a para-elliptical reflection;

a high pass filter comprises a collimating lens for collimating said converging beam to provide a predominantly collimated beam;

a stoplight hologram supported adjacent the inside surface of the vehicle rear window for diffracting said collimated beam to provide stoplight illumination.

2. The holographic stoplight system of claim 1 wherein said high pass filter comprises a collimating plano-concave cylindrical Fresnel lens.

3. The holographic stoplight system of claim 1 wherein said stoplight hologram is supported by said high pass filter.

4. The holographic stoplight system of claim 1 wherein said stoplight hologram is attached to the inside surface of the rear window.

\* \* \* \* \*